United States Patent [19]

Shiba et al.

[11] Patent Number: 4,543,724

[45] Date of Patent: Oct. 1, 1985

[54] MEASURING DEVICE FOR OBLIQUE ANGLE

[75] Inventors: Kazuo Shiba; Masakazu Miyashita, both of Tokorozawa, Japan

[73] Assignee: Citizen Watch Co., Ltd., Tokyo, Japan

[21] Appl. No.: 551,885

[22] Filed: Nov. 15, 1983

[30] Foreign Application Priority Data

Nov. 24, 1982 [JP] Japan .................. 57-204580
Dec. 7, 1982 [JP] Japan .................. 57-214321

[51] Int. Cl.$^4$ .............................................. G01C 1/00
[52] U.S. Cl. ........................................ 33/1 N; 33/366; 318/648
[58] Field of Search ................ 33/1 N, 1 PT, 366; 318/648, 649, 652; 73/517 R, 701, 862.61

[56] References Cited

U.S. PATENT DOCUMENTS 2,958,137 11/1960 Mueller ............................. 33/366
3,436,626 4/1969 Phelps et al. ..................... 318/648

FOREIGN PATENT DOCUMENTS 1559106 1/1969 France ..................... 33/DIG. 2

Primary Examiner—William D. Martin, Jr.
Attorney, Agent, or Firm—Sherman and Shalloway

[57] ABSTRACT

A measuring device for oblique angle which is wide in the range of measurement and is high in measuring accuracy, wherein an oblique table is controlled in such a way that the oblique table static-pressure supported is subjected to servo-control so that a detection signal of an oblique angle detector is zero, and an oblique angle is measured by the control signal.

4 Claims, 4 Drawing Figures

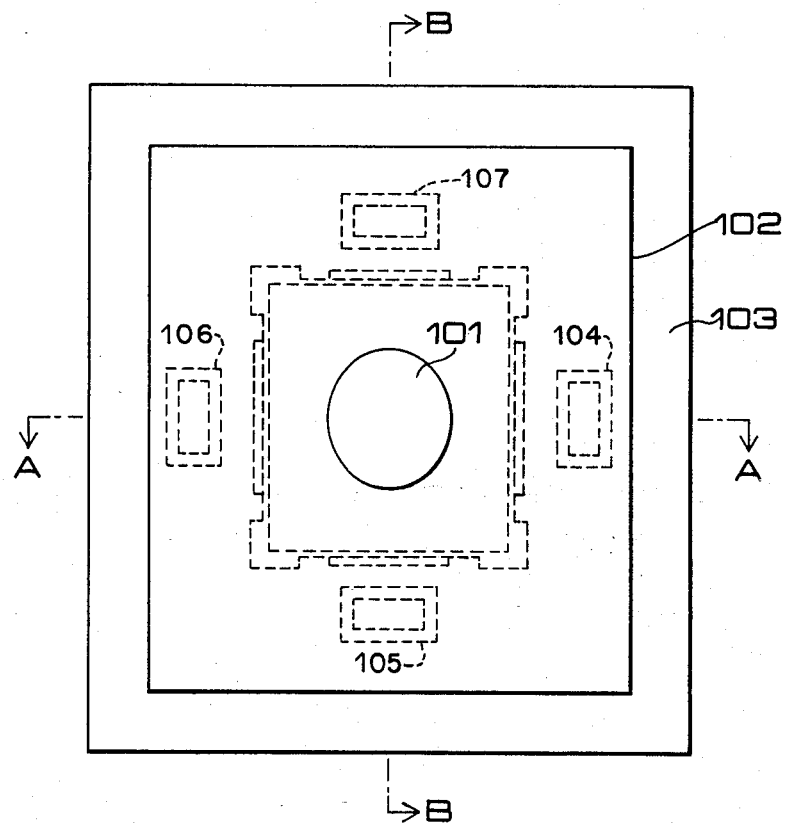
F I G. 1

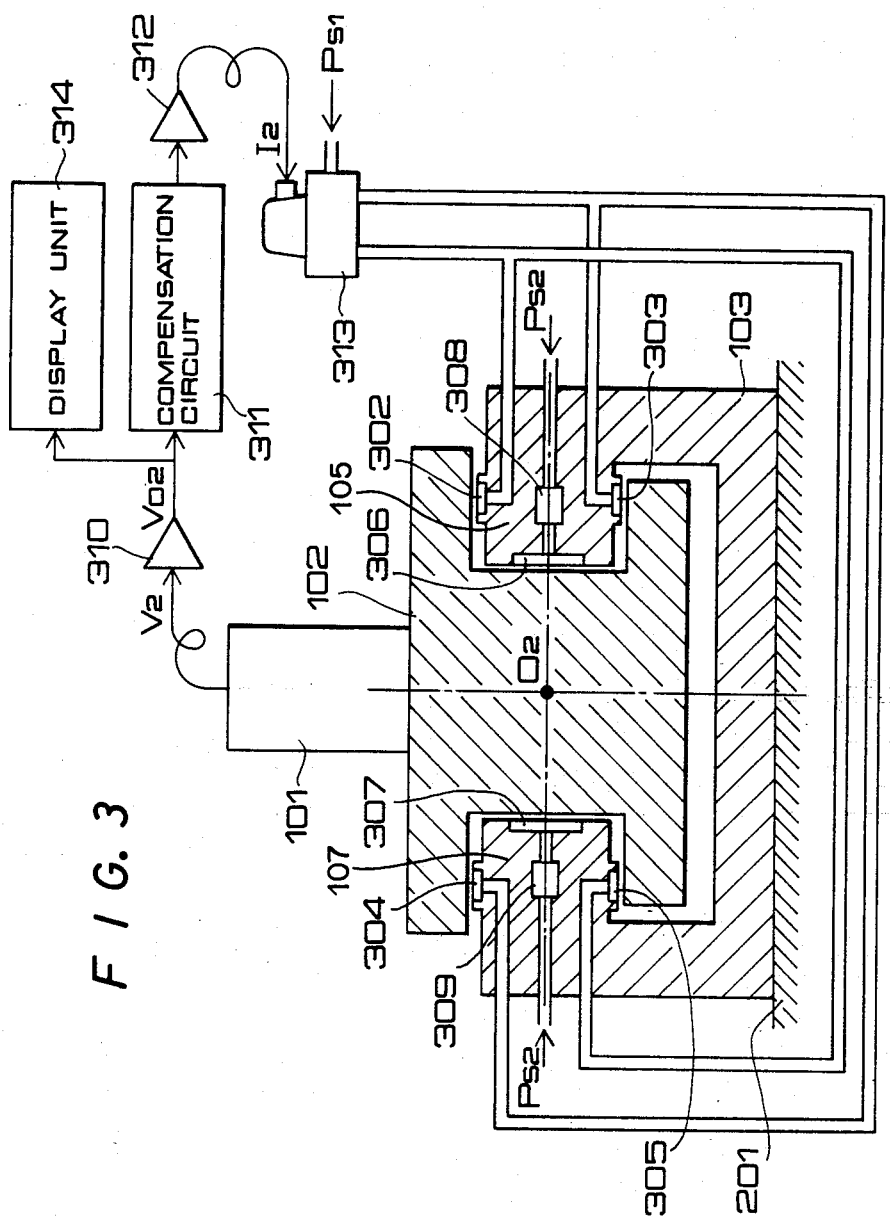
F I G. 3

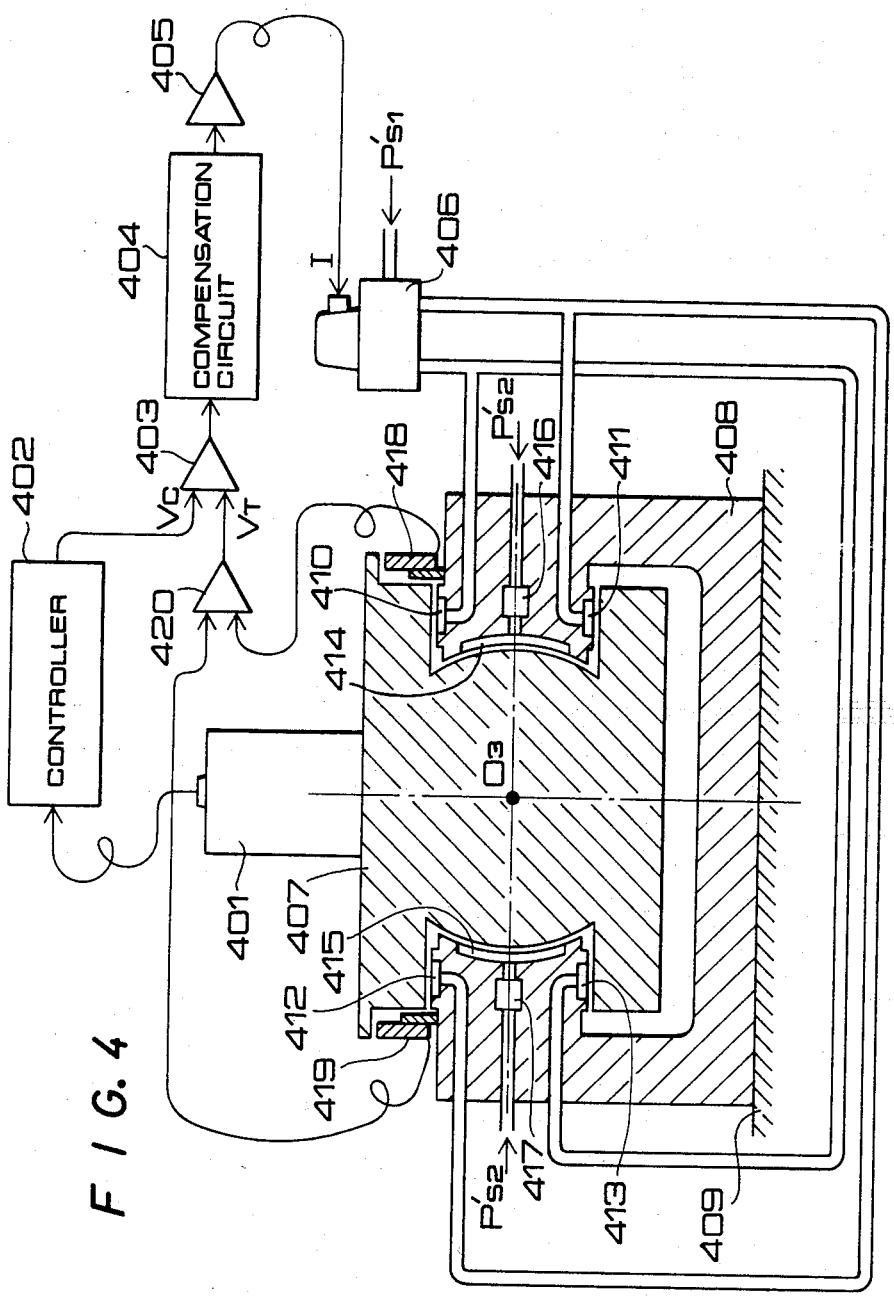
F I G. 4

MEASURING DEVICE FOR OBLIQUE ANGLE

BACKGROUND OF THE INVENTION

1. Field of the Invention

The present invention relates to a measuring device for oblique angle which is used to measure an oblique angle of a surface to be measured, to measure precision of motion of an object to be measured, and to measure a flatness of a platen or the like.

2. Description of the Prior Art

It is generally desired that a measuring instrument used when an oblique angle is measured is high in resolution, high in linearity in the range of required measurement and has no hysteresis. In the past, to measure the oblique angle, optical measuring instruments have been used such as an auto-collimater and a laser measuring device, and levels and inclinometers making use of a pendulum.

The optical measuring instruments such as an auto-collimater or laser measuring device make a great error if the measuring range is widely taken. Sometimes, a light projecting and receiving instrument has to be placed on a reference surface independently of a surface to be measured to undergo a spatial restriction. Furthermore, it has not been possible to measure rolling out of precision of motion. In the absolute oblique angle measuring instrument such as an inclinometer or a level, an oblique angle can be measured by mere placement thereof on a surface to be measured, and therefore, it is free from spatial restriction. However, there are disadvantages in that if the resolution is increased, the range of measurement becomes narrow, and if the range of measurement is increased, an error resulting from non-linearity increases.

SUMMARY OF THE INVENTION

It is an object of the present invention to provide an measuring device for oblique angle wherein an oblique angle detector is used in the neighbourhood where a detection signal thereof is zero whereby an error due to non-linearity of sensitivity can be disregarded, and the working range of an inclining device is made to be greater than the measuring range of the oblique angle detector whereby the resolution is made to be high and the measuring range is wide.

According to an aspect of the present invention, there is provided a measuring device for oblique angle comprising a support member placed on a surface to be measured, an oblique table rotatably supported by at least a pair of static pressure bearings on the support member, and an oblique angle detector placed on the oblique tabel to detect a difference in oblique angle between the surface to be measured and the oblique table, wherein applied pressure to the bearing is controlled whereby a detection signal of the oblique angle detector will always be zero.

BRIEF DESCRIPTION OF THE DRAWINGS

FIG. 1 is a plan view showing one embodiment of a measuring device for oblique angle in accordance with the present invention;

FIG. 3 is a partial section taken on line B—B showing the device of FIG. 1; and

FIG. 4 is a partial section showing another embodiment of the present invention.

DESCRIPTION OF PREFERRED EMBODIMENTS

Figure 2:
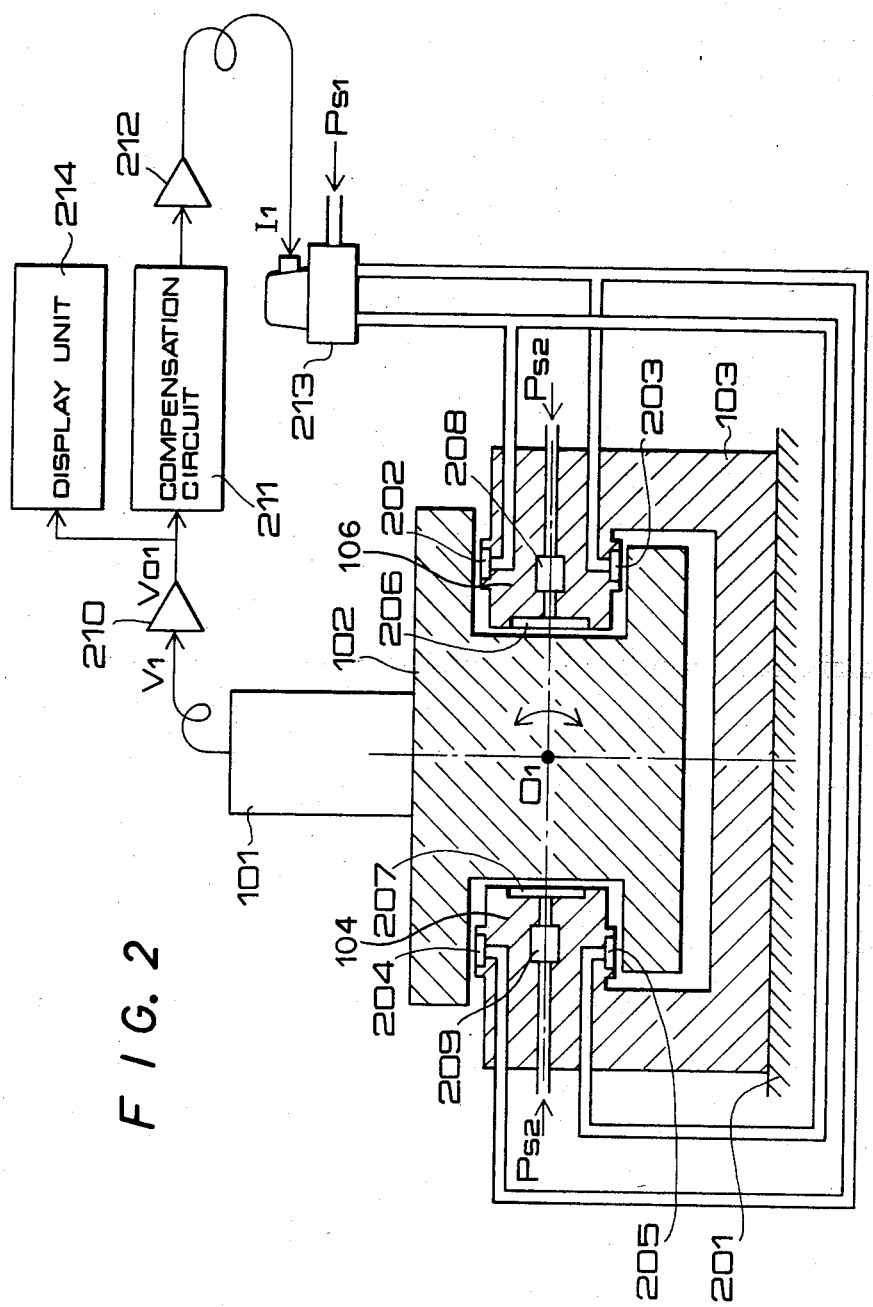
FIG. 2 is an explanatory view showing the device of FIG. 1 in partial section taken on line A—A.

In FIG. 1, an oblique angle detector 101 is secured to an oblique table 102 static-pressure supported on a holding memeber 103 through a set clearance by static pressure bearing 104, 105, 106 and 107.

In FIG. 2, a servo-valve 213 can be operated to control applied pressures to an upper static pressure pad 202 on bearing 106 and a lower static pressure pad 205 on bearing 104, and a lower static pressure pad 203 on bearing 106 and an upper static pressure pad 204 on bearing 104 to incline the oblique table 102 about a point $O_1$. Static pressure pads 206 on bearing 106 and 207 on bearing 104 arranged to left and right of the oblique table 102 are respectively subjected to given applied pressure $P_{s2}$ through fixed throttles 208 and 209. This constitutes a static pressure holding mechanism which holds the oblique table 102 at a given position in a lateral direction.

When the oblique table 102 is inclined about the point $O_1$, a detection signal $V_1$ is sent by the oblique angle detector 101 to an amplifier 210 for amplification. This amplified signal $V_{o1}$ is introduced into the servo-valve 213 through a compensation circuit 211 and a servo-amplifier 212. The amplified signal $V_{o1}$ is also introduced into an oblique angle display unit 214 to be displayed thereon as an oblique angle.

FIG. 3 is a sectional view taken on line B—B showing the device of FIG. 1. The same parts in FIG. 3 as those shown in FIGS. 1 and 2 are indicated by the same reference numerals. In FIG. 3, a servo-valve 313 can be operated to control applied pressures to an upper static pressure pad 302 on bearing 105 and a lower static pressure pad 305 on bearing 107, and a lower static pressure pad 303 on bearing 105 and an upper static pressure pad 304 on bearing 107 to incline the oblique table 102 about a point $O_2$. Static pressure pads 306 on bearing 105 and 307 on bearing 107 arranged to left and right of the oblique table 102 are subjected to given applied pressure $P_{s2}$ through fixed restrictors 308 and 309. This constitutes a static pressure holding mechanism which holds the oblique table 102 at a given position in a lateral direction.

When the oblique table 102 is inclined about the point $O_2$, a detection signal $V_2$ is sent by the oblique angle detector 101 to an amplifier 310 for amplification. This amplified signal $V_{o2}$ is introduced into the servo-valve 313 through a compensation circuit 311 and a servo-amplifier 312. The thus amplified signal $V_{o2}$ is introduced into an oblique angle display unit 314 to be displayed thereon as an oblique angle.

As will be apparent from the description in connection with FIGS. 2 and 3, in the oblique angle measuring device of the present invention, pressures are differentially applied by the servo-valves 213 and 313 to the opposed static pressure pads 202 and 203, 204 and 205, and 302 and 303 and 304 and 305, respectively, to thereby control the oblique table 102. It is necessary, when the detection signals $V_1$ and $V_2$ of the oblique angle detector 101 are zero, to balance the pressures of the static pressure pads 202, 205 and 203, 204, and 302, 305 and 303, 304.

Next, the operation of the device of the present invention will be described in detail by making reference to FIG. 2.

The oblique angle detector 101 provided on the oblique table 102 detects a difference between the oblique angle of the surface 201 to be measured and the oblique angle between the support member 103 placed on the surface 201 to be measured and the oblique table 102. A difference between the thus detected detection angles is supplied as a control signal $I_1$ to the servo-valve 213 through the amplifier 210, the compensation circuit 211 and the servo-amplifier 212. This servo-valve 213 distributes the applied pressure $P_{s1}$ so that a pressure difference between the upper static pressure pad 202, lower static pressure pad 205, and lower static pressure pad 203, upper static pressure pad 204 is proportional to the control signal $I_1$ and the detection signal $V_1$ of the oblique angle detector 101 is zero.

The oblique table 102 receives the force from the static pressure pads 202 to 205 and is balanced when the detection signal $V_1$ of the oblique angle detector 101 is substantially zero. When the loop gain of the servo-system is sufficiently increased, the detection signal $V_1$ becomes small but the relation between the oblique angle of the table and the detection signal $V_1$ is linear.

Then, when the oblique angle of the surface 201 to be measured varies, the correction operation as mentioned above is carried out and the oblique table 102 is inclined through an amount wherein the oblique angle of the surface 201 to be measured varied. At this time, the detection signal $V_1$ of the oblique angle detector 101 varies through an amount corresponding to the oblique angle of the surface 201 to be measured, and therefore, if a portion of such variation is known, the variation of the oblique angle can be known.

The operation of FIG. 3 is totally the same as that of FIG. 2.

FIG. 4 is an explanatory view showing another embodiment of the present invention. An oblique angle detector 401 is secured to an oblique table 407 static-pressure supported by six static pressure pads 410 to 415 through a set clearance with respect to a holding member 408 placed on a surface 409 to be measured. A servo-valve 406 can be operated to control applied pressures to the upper static pressure pad 410, lower static pressure pad 413, and upper static pressure pad 412, lower static pressure pad 411 to incline the oblique table 407 about $O_3$ as shown. Also, static pressure pads 414 and 415 arranged to left and right of the oblique table 407 receive give applied pressure $P'_{s2}$ through fixed restrictors 416 and 417. This constitutes a static pressure holding mechanism which holds the oblique table 407 at a given position in a lateral direction.

Displacement detectors 418 and 419 are held on a support member 408 opposedly of the oblique table 407 to detect relative displacement between the support member 408 and oblique table 407. A differential amplifier 420 obtains a difference of displacement detection signal of the displacement detectors 418 and 419 to release an oblique angle signal $V_T$ of the oblique table 407 to the differential amplifier 403. A controller 402 releases a control signal $V_c$ to the differential amplifier 403 so that the detection signal of the oblique angle detector 401 is zero. This differential amplifier 403 obtains a difference between the oblique angle signal $V_T$ of the differential amplifier 420 and the control signal $V_c$ of the controller 402 to amplify the difference. This amplified error signal passes through the compensation circuit 404 and is supplied as a control signal I to the servo-valve 406 through the servo-amplifier 405.

The servo-valve 406 applies pressure differentially to the opposed upper and lower static pressure pads 410, 413 and 411, 412 in accordance with the control signal I to thereby rotate the oblique table 407. At the time it is rotated through the control signal $V_c$ of the controller 402, pressures of the upper and lower static pressure pads 410, 413 and 411, 412 are balanced.

In the device of the present embodiment, the servo-valve 406 applies pressure differentially to the opposed static pressure pads 410, 411 and 412, 413 in accordance with the drive signal to thereby control the oblique table 407. At the time it is inclined through an angle proportional to the instruction signal, pressures of the static pressure pads 410, 411 and 412, 413 need be balanced.

Next, the operation of the oblique angle measuring device in accordance with the present embodiment will be described in detail. When the surface to be measured 409 is inclined, the support member 408 is also inclined, and the oblique table 407 static-pressure supported on the support member 408 is inclined. The oblique angle of the oblique table 407 is detected by the oblique angle detector 401 and released to the controller 402. The controller 402 always releases the control signal $V_c$ so that output of the oblique angle detector 401 is zero. On the other hand, a difference in displacement detection signals of the displacement detectors 418, 419 held on the support member 408 is obtained by the differential amplifier 420 to thereby obtain the oblique angle of the oblique table 407. The differential amplifier 403 differentiates and amplifies the oblique angle as a difference relative to the control signal $V_c$ of the controller 402.

This amplified error signal passes through the compensation circuit 404, is amplified by the servo-amplifier 405 and is supplied as the control signal I to the servo-valve 406. The servo-valve 406 distributes the applied pressure $P'_{s1}$ so that a pressure differential of the upper and lower static pressure pads 410, 413 and 411, 412 is proportional to the control signal I. That is, if the applied pressure to the static pressure pads 410, 413 is made to be higher than the applied pressure to the static pressure pads 411, 412, the oblique table 407 rotates clockwise, and in the reverse case, the oblique table 407 rotates counterclockwise.

In this manner, when the oblique table 407 rotates, outputs of the displacement detectors 418 and 419 vary, the oblique angle signal $V_T$ varies and is substantially equal to the control signal $V_c$ of the controller 402. The operation is then completed. At this time, a difference between the control signal $V_c$ and the oblique angle signal $V_T$ can be decreased by sufficiently increasing the loop gain of the servo-system.

Since the absolute value of the oblique angle between the surface 409 to be measured and the oblique table 407 is made equal, if the oblique angle of the oblique table 407 is determined, the oblique angle of the surface 409 to be measured can be found. Also, since the control signal $V_c$ or oblique angle signal $V_T$ is proportional to the oblique angle of the oblique table 407, if the control signal $V_c$ or the oblique angle signal $V_T$ is measured, the oblique angle of the surface 409 to be measured can be measured.

Experiments reveal that the oblique table was controlled by resolution of 0.02 seconds. Thus, if the resolution is in excess of 0.02 seconds in the vicinity of zero in the oblique angle detector, measurement for 0.02 seconds can be achieved by the device of the present invention.

While in the above-described embodiment, a nozzle flapper type servo-valve has been used, it will be noted that other types of servo-valve may be used.

In addition, the oblique angle detector is to convert the oblique angle of the oblique table into an electric signal. While in the present embodiment, the inclinometer of the pendulum type has been used, it will be noted that an electric type level, a photoelectric type auto-collimater and a laser measuring apparatus can be used.

Moreover, a liquid such as an oil or a gas such as air can be used as the working fluid.

The present device can be applied to a single shaft as well as a multi-shaft.

It is noted that the compensation circuits 211, 311 and 404 shown in FIGS. 2 to 4 are provided to control the characteristics in the correction operation of the control system, for example, the steady state characteristics.

As described above, in the oblique angle measuring device of the present invention, the oblique angle detector is used in the vicinity of zero to thereby remove an error resulting from non-linearity of sensitivity of the oblique angle detector, and the applied pressure of the static pressure pads is controlled to vary a holding clearance to coincide the surface to be measured with the inclination of the oblique table with high accuracy, thus providing measurement of the oblique angle with high accuracy.

Furthermore, by increasing the working range of the oblique device more than that of the oblique angle detector, it is also possible to increase the range of measurement. In addition, in accordance with the present invention, pitching and rolling out of precision of motion can be measured at the same time, thereby increasing the efficiency of measurement.

Moreoever, if the control signal is generated so that a difference in inclination between the surface to be measured and the oblique table is zero and a force is applied to the oblique table as an object to be controlled through the static pressure pads so that the control signal and the oblique angle signal of the table is equal to each other, the surface to be measured and the inclination of the oblique table can be brought into coincidence with each other with high accuracy to remove an error resulting from non-linearity of sensitivity of the oblique angle detector, thereby providing the measurement of the oblique angle with high accuracy.

What is claimed is:

1. A measuring device for oblique angle, comprising:
   (a) a support member placed on a surface to be measured;
   (b) an oblique table rotatably supported by at least a pair of static pressure bearings on said support member; and
   (c) an oblique angle detector placed on said oblique table to detect an oblique angle of said oblique table, whereby applied pressure to said static pressure bearings in controlled to thereby always render a detection signal of said oblique angle detector zero, and
   further comprising at least one pair of first static pressure pads provided opposedly to said static pressure bearings, a servo-valve for supplying working pressure corresponding to the detection signal of said oblique angle detector, a servo-amplifier adapted to drive said servo-valve, and a plurality of second static pressure pads for applying working pressure generated from said servo-valve in a direction wherein the detection signal of said oblique angle detector is zero.

2. A measuring device of claim 1 further comprising a display unit for displaying an oblique angle from a signal by which said servo-valve is driven.

3. A measuring device for oblique angle, comprising:
   (a) a support member placed on a surface to be measured;
   (b) an oblique table rotatably supported by at least a pair of static pressure bearings on said support member; and
   (c) an oblique angle detector placed on said oblique table to detect an oblique angle of said oblique table, whereby applied pressure to said static pressure bearings is controlled to thereby always render a detection signal of said oblique angle detector zero,
   further comprising at least a pair of static pressure pads provided opposedly to said static pressure bearings, a controller connected to said oblique angle detector to generate a control signal so that the detection signal is always zero, a displacement detector for detecting relative displacement between said oblique table and said support member, a differential amplifier for amplifying a difference between a displacement signal of said displacement detector and a control signal of said controller, a servo-amplifier for amplifying an error signal from said differential amplifier, and a servo-valve for distributing applied pressure of working fluid to said static pressure pads in response to the control signal of said servo-amplifier.

4. A measuring device of claim 3 further comprising a compensation circuit for receiving the detection signal of said oblique angle detector.

* * * * *

UNITED STATES PATENT AND TRADEMARK OFFICE
CERTIFICATE OF CORRECTION

PATENT NO. : 4,543,724
DATED : October 1, 1985
INVENTOR(S) : KAZUO SHIBA, ET AL.

It is certified that error appears in the above-identified patent and that said Letters Patent is hereby corrected as shown below:

IN THE CLAIMS

Claim 4, line 1, (column 6, line 50),
delete "claim 3", and insert --claim 1 or 3--.

Signed and Sealed this

Third Day of December 1985

[SEAL]

Attest:

DONALD J. QUIGG

Attesting Officer     Commissioner of Patents and Trademarks